United States Patent
Takeda et al.

(10) Patent No.: US 10,755,563 B2
(45) Date of Patent: Aug. 25, 2020

(54) DRIVING ASSISTANCE SYSTEM

(71) Applicant: TOYOTA JIDOSHA KABUSHIKI KAISHA, Toyota-shi (JP)

(72) Inventors: Masahiro Takeda, Mitaka (JP); Naoki Kurokawa, Tokyo (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 16/560,388

(22) Filed: Sep. 4, 2019

(65) Prior Publication Data
US 2020/0118428 A1    Apr. 16, 2020

(30) Foreign Application Priority Data
Oct. 16, 2018  (JP) .................................. 2018-195252

(51) Int. Cl.
  *G08G 1/07*  (2006.01)
  *G08G 1/01*  (2006.01)
  *H04W 4/44*  (2018.01)
(52) U.S. Cl.
  CPC ............. *G08G 1/07* (2013.01); *G08G 1/0145* (2013.01); *H04W 4/44* (2018.02)
(58) Field of Classification Search
  CPC .......... G08G 1/07; G08G 4/0145; H04W 4/44
  USPC ....................................................... 340/918
  See application file for complete search history.

(56) References Cited

U.S. PATENT DOCUMENTS

| | | | | |
|---|---|---|---|---|
| 5,703,778 A | * | 12/1997 | Takahashi | G08G 1/08 340/910 |
| 8,736,461 B2 | * | 5/2014 | Sharma | G08G 1/08 340/906 |
| 2006/0155427 A1 | * | 7/2006 | Yang | G08G 1/081 701/1 |
| 2008/0266136 A1 | * | 10/2008 | Diba | G08G 1/095 340/906 |
| 2012/0326891 A1 | * | 12/2012 | Cross | G08G 1/082 340/906 |
| 2017/0270785 A1 | | 9/2017 | Umehara | |
| 2018/0132285 A1 | * | 5/2018 | Jackson | G08G 1/0955 |

FOREIGN PATENT DOCUMENTS

JP    2016115123 A    6/2016

* cited by examiner

*Primary Examiner* — Kerri L McNally
(74) *Attorney, Agent, or Firm* — Hunton Andrews Kurth LLP

(57) ABSTRACT

A driving assistance system includes a plurality of in-vehicle devices configured to communicate with a roadside device. The plurality of in-vehicle devices are mounted on a plurality of vehicles travelling in a row, respectively. Based on information on a response to travelling in a row, acquired from the roadside device, one of the plurality of in-vehicle devices determines whether a traffic signal controller that controls a traffic signal device is configured to perform control to give priority to the plurality of vehicles travelling in a row. Based on a result of the determination, the driving assistance system selects one in-vehicle device, from among the plurality of in-vehicle devices, to transmit, to the roadside device, a request signal requesting to give priority to the plurality of vehicles.

7 Claims, 6 Drawing Sheets

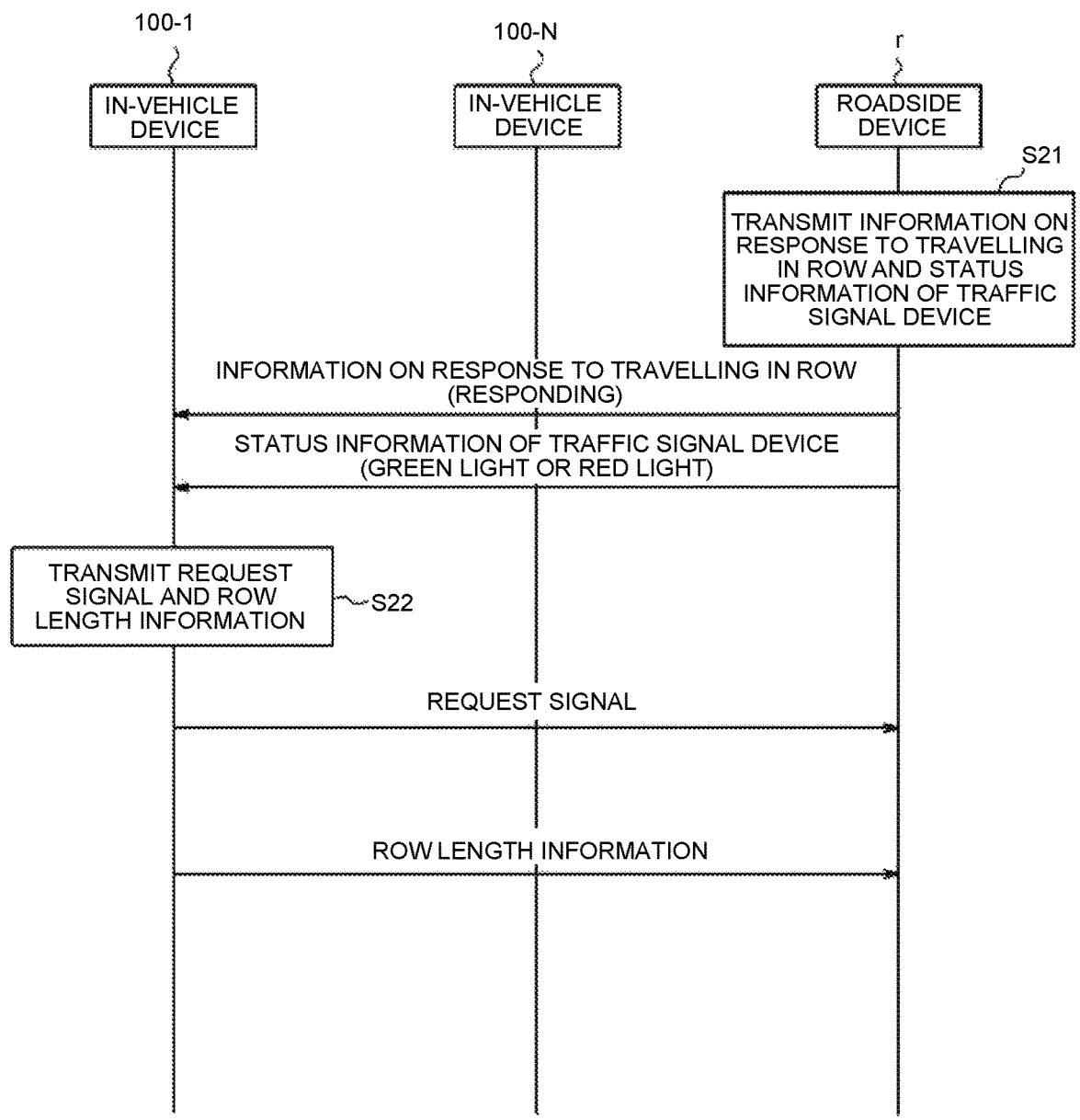

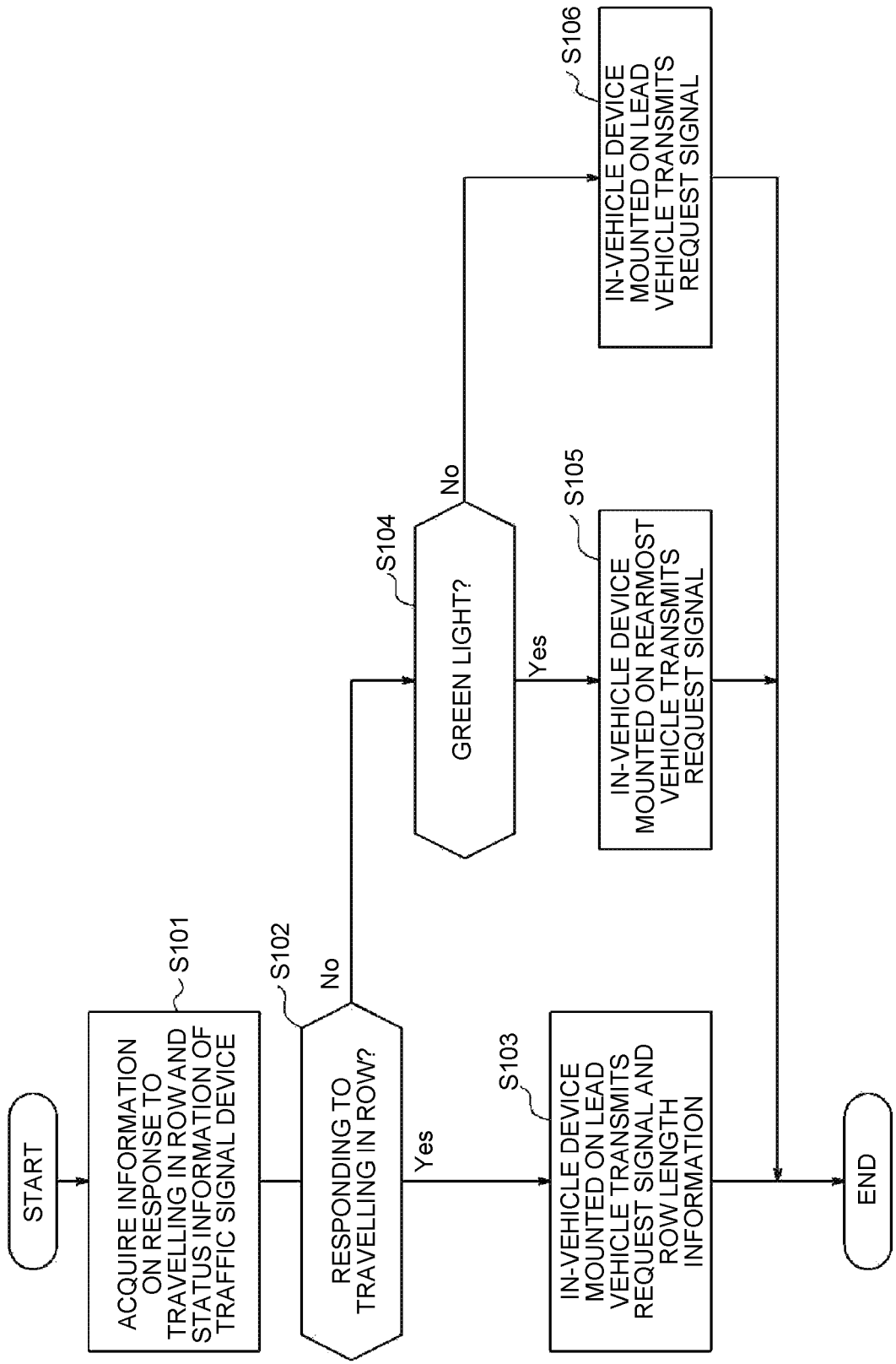

DRIVING ASSISTANCE SYSTEM

INCORPORATION BY REFERENCE

The disclosure of Japanese Patent Application No. 2018-195252 filed on Oct. 16, 2018 including the specification, drawings and abstract is incorporated herein by reference in its entirety.

BACKGROUND

1. Technical Field

The present disclosure relates to a driving assistance system of a vehicle.

2. Description of Related Art

A public transportation priority system (PTPS) that gives priority to public transport vehicles such as route buses by controlling a traffic signal device has been put to practical use. For example, in PTPS, when a bus approaches an intersection just before a termination of a display of a green light, a display time of the green light can be extended. In addition, for example, when the bus approaches an intersection where a red light is being displayed, a display time of the red light can be shortened.

Further, in public transport, a plurality of vehicles travelling in a row has been proposed. For example, when a plurality of buses travel in a row, improved transportation capacity and mitigation of traffic congestion are expected. For example, Japanese Unexamined Patent Application Publication No. 2016-115123 (JP 2016-115123 A) proposes a traffic signal controller that performs priority control based on the position information of the rearmost vehicle of public transport vehicles travelling in a row.

SUMMARY

However, a traffic signal controller responding to travelling in a row, as described in JP 2016-115123 A, is not available in every region. Thus, there has been a demand for a technology that prevents a row of vehicles from being divided during travelling on the premise that there is a traffic signal controller that does not respond to travelling in a row.

The present disclosure provides a driving assistance system that reduces the probability of a row of vehicles being divided even when a traffic signal controller does not respond to travelling in a row.

A driving assistance system according to one aspect of the present disclosure includes a plurality of in-vehicle devices configured to communicate with a roadside device. The plurality of in-vehicle devices are mounted on a plurality of vehicles travelling in a row, respectively. Based on information on a response to travelling in a row, acquired from the roadside device, one of the plurality of in-vehicle devices determines whether a traffic signal controller that controls a traffic signal device is configured to perform control to give priority to the plurality of vehicles travelling in a row. The driving assistance system is configured to select, based on a result of the determination, one in-vehicle device, from among the plurality of in-vehicle devices, to transmit a request signal requesting to give priority to the plurality of vehicles to the roadside device.

When the one of the plurality of in-vehicle devices determines that the traffic signal controller is not configured to perform control to give priority to the plurality of vehicles travelling in a row and an extension of a display time of a green light of the traffic signal device is required, an in-vehicle device mounted on the rearmost vehicle among the plurality of vehicles may transmit the request signal.

The extension of the display time of the green light of the traffic signal device may be requested when a traffic light is green.

When the one of the plurality of in-vehicle devices determines that the traffic signal controller is not configured to perform control to give priority to the plurality of vehicles travelling in a row and shortening of a display time of a red light of the traffic signal device is required, an in-vehicle device mounted on a lead vehicle among the plurality of vehicles may transmit the request signal.

The shortening of the display time of the red light of the traffic signal device may be requested when a traffic light is not green.

When the one of the plurality of in-vehicle devices determines that the traffic signal controller is configured to perform control to give priority to the plurality of vehicles travelling in a row, the in-vehicle device mounted on the lead vehicle among the plurality of vehicles may transmit the request signal.

When the one of the plurality of in-vehicle devices determines that the traffic signal controller is configured to perform control to give priority to the plurality of vehicles travelling in a row, the in-vehicle device mounted on the lead vehicle among the plurality of vehicles may further transmit row length information of the plurality of vehicles.

With a driving assistance system according to the foregoing aspect of the present disclosure, even a traffic signal controller that does not respond to travelling in a row can reduce the probability of a row of vehicles being divided.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 5 is a sequence diagram illustrating a case in which the traffic signal controller does not respond to travelling in a row; and FIG. 6 is a flowchart illustrating a determination process of the driving assistance system.

DETAILED DESCRIPTION OF EMBODIMENTS

Schematic Configuration of Driving Assistance System

Figure 1:
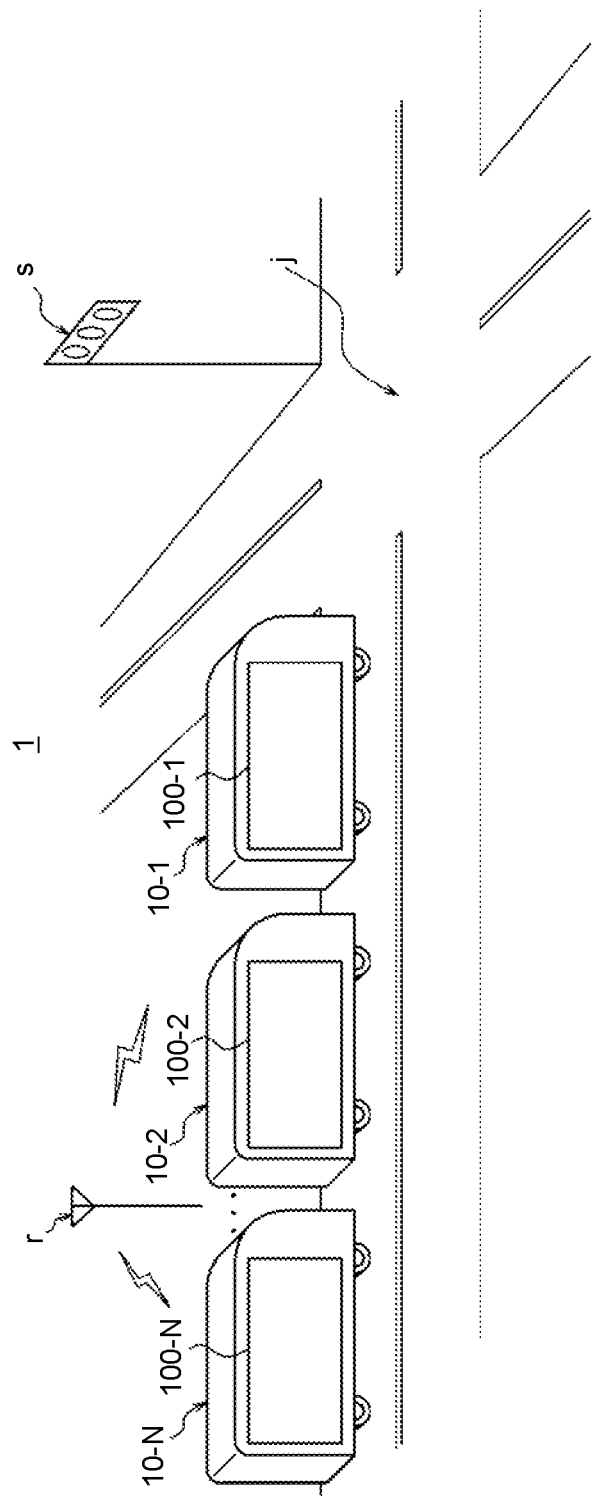
FIG. 1 is a diagram schematically illustrating a configuration of a driving assistance system.

FIG. 1 is a diagram illustrating a configuration of a driving assistance system 1 according to the present embodiment. The driving assistance system 1 includes a plurality of in-vehicle devices 100-1, 100-2, . . . , 100-N. As illustrated in FIG. 1, the in-vehicle devices 100-1, 100-2, . . . , 100-N are mounted on vehicles 10-1, 10-2, . . . , 10-N travelling in a row, respectively. Here, N is an integer equal to or greater than two. Hereinafter, in some cases, the in-vehicle devices 100-1, 100-2, . . . , 100-N are collectively referred to as "in-vehicle devices 100". In addition, in some cases, the vehicles 10-1, 10-2, . . . , 10-N are collectively referred to as "vehicles 10". In the driving assistance system 1, the in-vehicle devices 100 are connected to one another via inter-vehicle communication or mobile communication.

Here, the vehicle 10 refers to, for example, a public transport vehicle.

Examples of the public transport vehicle include a route bus or a circulator bus for a specified section or within facilities such as an airport and an amusement park. As described above, the vehicles 10 travel in a row. Travelling in a row means that a plurality of vehicles travel in formation of a row. The vehicles 10 travel in a row by consecutively following their respective preceding vehicles and travelling along a predetermined route. The vehicles 10 travel in a row while ensuring a safe inter-vehicle distance and complying the traffic laws. In the present embodiment, although one row of vehicles 10 is described as an example, the number of rows may be plural. Further, the number of vehicles 10 forming a row may be any number equal to or greater than two. In the present embodiment, the vehicle 10-1 is a leader, and the vehicle 10-2 and following are behind the vehicle 10-1.

Figure 2:
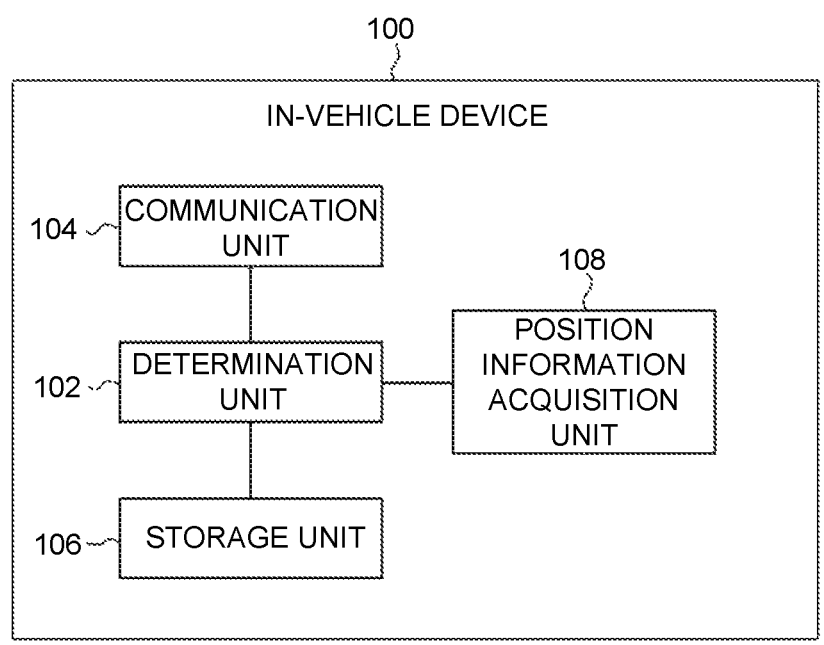
FIG. 2 is a block diagram schematically illustrating a configuration of an in-vehicle device.

FIG. 2 is a block diagram schematically illustrating a configuration of the in-vehicle device 100. The in-vehicle device 100 includes a determination unit 102, a communication unit 104, a storage unit 106, and a position information acquisition unit 108. In the present embodiment, each of the in-vehicle devices 100-1, 100-2, . . . , 100-N, illustrated in FIG. 1, has a configuration illustrated in FIG. 2.

The determination unit 102 is, for example, an electronic control unit (ECU) including a processor, a memory, and an input and output circuit. For example, the determination unit 102 transmits and receives identification (ID) information with other vehicles via the communication unit 104, and recognizes the order of its subject vehicle within the row and the number of vehicles forming the row. Moreover, for example, when the subject vehicle is the lead vehicle 10-1 or the rearmost vehicle 10-N, the determination unit 102 can cause the communication unit 104 to transmit a request signal and the like, to be described below. Further, based on a travelling state of other vehicles, acquired via the communication unit 104, the determination unit 102 may calculate an inter-vehicle distance. The determination unit 102 may notify a driver of the inter-vehicle distance so that the vehicles 10 can travel in a row while maintaining an appropriate inter-vehicle distance.

The communication unit 104 includes, for example, a radio for inter-vehicle communication. In addition, the communication unit 104 may include, for example, a communication interface corresponding to a mobile communication standard such as fourth generation (4G) and fifth generation (5G) mobile communication, and a control circuit thereof. The communication unit 104 transmits and receives information with communication units 104 of other vehicles via wireless communication. The in-vehicle devices 100 of the vehicles 10 forming the row transmit and receive information directly with one another via the communication unit 104 of each of the vehicles 100 forming the row. Alternatively, the in-vehicle devices 100 transmit and receive information indirectly with one another via the vehicles positioned in the middle of the row. Alternatively, the in-vehicle devices 100 transmit and receive information indirectly with one another via a mobile communication service. In the present embodiment, the radio for inter-vehicle communication includes a millimeter-wave radar sensor. Inter-vehicle communication with a preceding vehicle is performed using a radio wave of a predetermined frequency (for example, 760 MHz) within a detection range of the millimeter-wave radar sensor (for example, within 200 m).

Moreover, in the present embodiment, the communication unit 104 can communicate with a roadside device "r". The communication between the communication unit 104 and the roadside device "r" may be executed, for example, via wireless communication of a specific frequency band (for example, 5.8 GHz band). The communication unit 104 can receive, for example, from the roadside device "r", information indicating the status of the traffic signal device "s" (for example, whether the traffic light is green or red). Here, communication between the communication unit 104 and the roadside device "r" is bidirectional. The roadside device "r" can transmit an instruction signal to a traffic signal controller that controls the traffic signal device "s" which is installed at an intersection "j", in response to the request signal received from the in-vehicle device 100.

Here, the request signal includes a signal requesting an extension of a display time of a green light (hereinafter, referred to as a green light extension request signal), to be described below. Alternatively, the request signal includes a signal requesting shortening of a display time of a red light (hereinafter, referred to as a red light shortening request signal), to be described below. The request signal is transmitted by one of the plurality of in-vehicle devices 100-1, 100-2, . . . , 100-N. Details of a method of transmitting the request signal will be described below. Here, the roadside device "r" communicating with the communication unit 104 is not limited to a physical beacon, and may include a virtual beacon. Moreover, the communication method between the communication unit 104 and the roadside device "r" is not limited to the above example. As another example, the roadside device "r" may include an optic beacon. The optic beacon includes a near-infrared light transmitter and receiver, and performs bidirectional communication with the in-vehicle device 100.

The storage unit 106 includes one or more memories. Examples of the memory may include a semiconductor memory, a magnetic memory, or an optic memory. Each memory included in the storage unit 106 may function as, for example, a primary storage device, a secondary storage device, or a cache memory. The storage unit 106 stores any information used for an operation of the in-vehicle device 100.

In the present embodiment, the storage unit 106 stores ID information unique to the subject vehicle. The ID information is used for communication with other vehicles forming the row, that is, inter-vehicle communication. In addition, the storage unit 106 stores row information. The row information is in regards to a row of the vehicles 10, and includes at least row length information, that is, information indicating how long the row is. Moreover, in the present embodiment, the row information includes information on the order within the row, that is, information indicating the order of each vehicle 10 within the row. The information on the order of vehicles within the row may be, for example, information indicating the vehicles 10 in order from the lead vehicle, using the ID information. Based on the ID information and the information on the order of vehicles within the row that are stored in the storage unit 106, the determination unit 102 can recognize the position of its subject vehicle within the row (for example, the lead vehicle 10-1). In addition, the row information can include information on the number of vehicles within the row, that is, information on the number of vehicles 10 forming the row.

The position information acquisition unit 108 includes, for example, a global positioning system (GPS) receiver. The GPS receiver receives a GPS signal from a GPS satellite. Based on the GPS signal from the position information acquisition unit 108, for example, the determination unit 102 calculates the position of its subject vehicle (for example, latitude and longitude). The position information of each of the vehicles 10 may be shared, for example, via inter-vehicle communication. Here, one of the plurality of in-vehicle devices 100-1, 100-2, . . . , 100-N may calculate the length of the row based on the position information of each of the vehicles 10 and the information on the order of each of the vehicles 10 within the row. The calculated length of the row may be shared among the vehicles 10 via, for example, inter-vehicle communication.

Method of Transmitting Request Signal

There are two kinds of traffic signal controllers that control the traffic signal device "s": a traffic signal controller responding to travelling in a row; and a traffic signal controller that does not respond to travelling in a row. The traffic signal controller responding to travelling in a row performs priority control, using the row length information of the public transport vehicles travelling in a row. For example, the traffic signal controller responding to travelling in a row performs control to give priority to the row of the vehicles 10 by estimating the time at which the rearmost vehicle 10-N within the row passes the intersection "j", and adjusting the display of the traffic signal device "s" to prevent the row of the vehicles from being divided. On the other hand, the traffic signal controller that does not respond to travelling in a row does not perform control to prevent the row of the vehicles 10 from being divided using the row length information. However, the traffic signal controller that does not respond to the vehicles travelling in a row, for example, extends the display time of the green light or shortens the display time of the red light in response to a request of an individual pubic transport vehicle. In other words, even the traffic signal controller that does not respond to travelling in a row can perform priority control.

However, when the traffic signal controller that does not respond to travelling in a row extends the display time of the green light of the traffic signal device "s", there is generally an upper limit to the display time to be extended. Therefore, even when each vehicle within the group consisting of the vehicles from the lead vehicle 10-1 to the rearmost vehicle 10-N transmits the green light extension request signal to the roadside device "r", an extended display time may reach the upper limit while the vehicles 10 are passing the intersection "j" and the traffic light may turn red before the vehicles in the group pass through the intersection "j". In other words, there is a possibility of the row of the vehicles being divided. The driving assistance system 1 according to the present embodiment can reduce the probability of the row of the vehicles being divided, by changing the vehicle 10 that transmits the request signal depending on situations to be described below.

When Traffic Signal Controller does not Respond to Vehicles Travelling in Row and Traffic Light is Green In a first case, it is assumed that the traffic signal controller does not respond to travelling in a row (that is, the traffic signal controller is not configured to perform control to give priority to the vehicles travelling in a row), and the traffic signal device "s" displays the green light. When the vehicles 10-1, 10-2, . . . , 10-N approach the intersection "j" just before the traffic signal device "s" terminates a display of the green light, the vehicle 10 transmits the green light extension request signal to the roadside device "r". In other words, the vehicles 10 transmit the green light extension request signal so that the row of the vehicles travelling in a row can pass through the intersection "j" without being divided by the red light of the traffic signal device "s". Here, the rearmost vehicle 10-N transmits the green light extension request signal to the roadside device "r". When the rearmost vehicle 10-N transmits the green light extension request signal to the roadside device "r", the vehicles that have not passed through the intersection "j" are only the last part of the group of vehicles including the rearmost vehicle 10-N. Thus, the probability that all the vehicles in the group pass through the intersection "j" within the extended display time of the green light is high. Therefore, it is preferable that the rearmost vehicle 10-N transmits the green light extension request signal to the roadside device "r".

Figure 3:
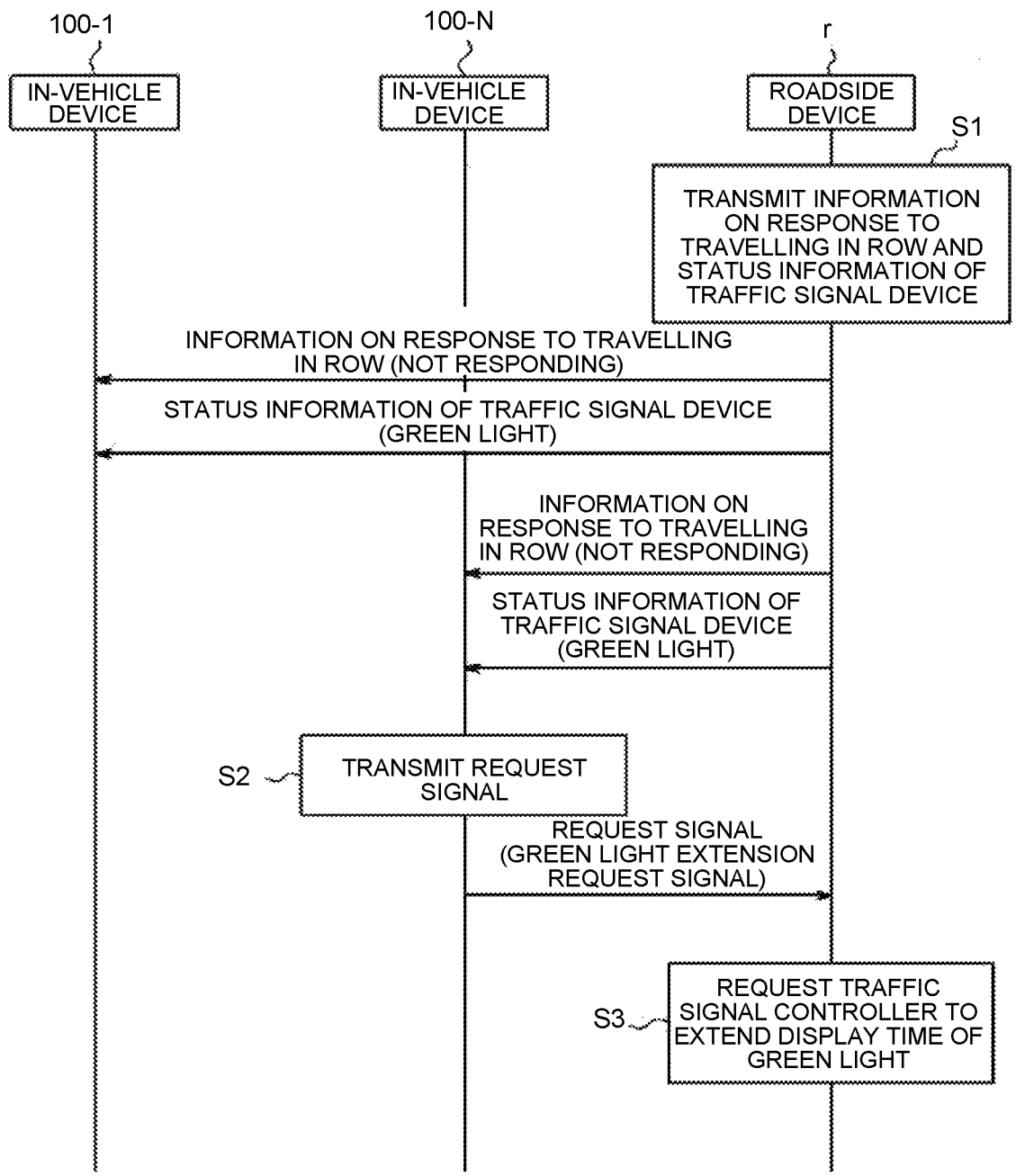
FIG. 3 is a sequence diagram illustrating a case in which a traffic signal controller does not respond to travelling in a row.

FIG. 3 is a sequence diagram illustrating a case in which the traffic signal controller does not respond to travelling in a row, and the traffic signal device "s" displays the green light.

The roadside device "r" transmits, to the vehicle 10 travelling in a row toward the intersection "j", the information on a response to travelling in a row and status information of the traffic signal device (step S1). The information on a response to travelling in a row indicates whether the traffic signal controller responds to travelling in a row. Based on the information on a response to travelling in a row, one of the plurality of in-vehicle devices 100-1, 100-2, . . . , 100-N determines whether the traffic signal controller that controls the traffic signal device "s" is configured to perform control to give priority to the plurality of vehicles travelling in a row. The result of the determination may be shared among the vehicles 10 via, for example, inter-vehicle communication. The status information of the traffic signal device indicates the status of the traffic signal device "s", and includes at least information on whether the traffic light is green or red.

Here, the information on a response to travelling in a row and the status information of the traffic signal device may be, as an example, part of PTPS downlink information of the traffic signal device "s" transmitted from the roadside device "r". For example, the information on a response to travelling in a row may be assigned a specific 1 bit of the PTPS downlink information. When the specific 1 bit is "0", it may indicate that the traffic signal controller does not respond to travelling in a row. In addition, when the specific 1 bit is "1", it may indicate that the traffic signal controller responds to travelling in a row. Moreover, for example, the status information of the traffic signal device may be assigned another specific 1 bit of the PTPS downlink information. If the another specific 1 bit is "0", it may indicate that the traffic signal device "s" displays the green light. In addition, if the another specific 1 bit is "1", it may indicate that the traffic signal device "s" displays the red light.

Further, the roadside device "r" may transmit the information on a response to travelling in a row and the status information of the traffic signal device at predetermined time intervals (for example, every 100 milliseconds). As another example, the roadside device "r" may be able to transmit the information on a response to travelling in a row and the status information of the traffic signal device in response to a request of the vehicle 10.

The roadside device "r" is installed at a predetermined distance (for example, a range from 150 m to 200 m) before the intersection "j". When the vehicle 10 travelling toward the intersection "j" approaches the position of the roadside device "r", the in-vehicle device 100 can acquire the information on a response to travelling in a row and the status information of the traffic signal device. The number of the roadside device "r" is not limited to one, and may be plural. Here, for example, as illustrated in FIG. 1, the group of vehicles consists of the vehicles from the vehicle 10-1 to the rearmost vehicle 10-N. For this reason, as illustrated in FIG. 3, the in-vehicle device 100-1 mounted on the lead vehicle 10-1 is the first, among the in-vehicle devices 100, which acquires, from the roadside device "r", the information on a response to travelling in a row and the status information of the traffic signal device. Then, the in-vehicle device 100-N mounted on the rearmost vehicle 10-N can communicate with the roadside device "r", and acquires the information on a response to travelling in a row and the status information of the traffic signal device. In the example of FIG. 3, the information on a response to travelling in a row indicates that the traffic signal controller does not respond to travelling in a row. Moreover, the status information of the traffic signal device indicates that the traffic signal device "s" displays the green light.

As described above, when the traffic signal controller that does not respond to travelling in a row is required to extend the display time of the green light of the traffic signal device "s", it is preferable that the rearmost vehicle 10-N transmits the request signal to the roadside device "r". After acquiring the information on a response to travelling in a row and the status information of the traffic signal device, the in-vehicle device 100-N mounted on the rearmost vehicle 10-N transmits the green light extension request signal to the roadside signal "r" (step S2).

Upon acquiring the green light extension request signal, the roadside device "r" requests the traffic signal controller that controls the traffic signal device "s" to extend the display time of the green light (step S3).

When Traffic Signal Controller does not Respond to Vehicles Travelling in Row and Traffic Light is Red In a second case, it is assumed that the traffic signal controller does not respond to travelling in a row and that the traffic signal device "s" displays the red light. When the traffic signal device "s" displays the red light when the vehicles 10-1, 10-2, . . . , 10-N approach the intersection "j", the vehicle 10 transmits the red light shortening request signal to the roadside device "r". In other words, the vehicle 10 transmits the red light shortening request signal so that, when the group of vehicles travelling in a row reaches the intersection "j", the vehicles can avoid the traffic signal device "s" from remaining displaying the red light. Here, the lead vehicle 10-1 transmits the red signal shortening request signal to the roadside device "r". The lead vehicle 10-1 that can first recognize the red light among the vehicles transmits the red signal shortening request signal, thereby increasing the probability that the red light turns green before the lead vehicle 10-1 reaches the intersection "j". In other words, when the vehicle 10 other than the lead vehicle 10-1 transmits the red light shortening request signal to the roadside device "r", there is a possibility that the red light does not turn green in time and thus the lead vehicle 10-1 would stop. Therefore, it is preferable that the lead vehicle 10-1 transmits the red light shortening request signal to the roadside device "r".

Figure 4:
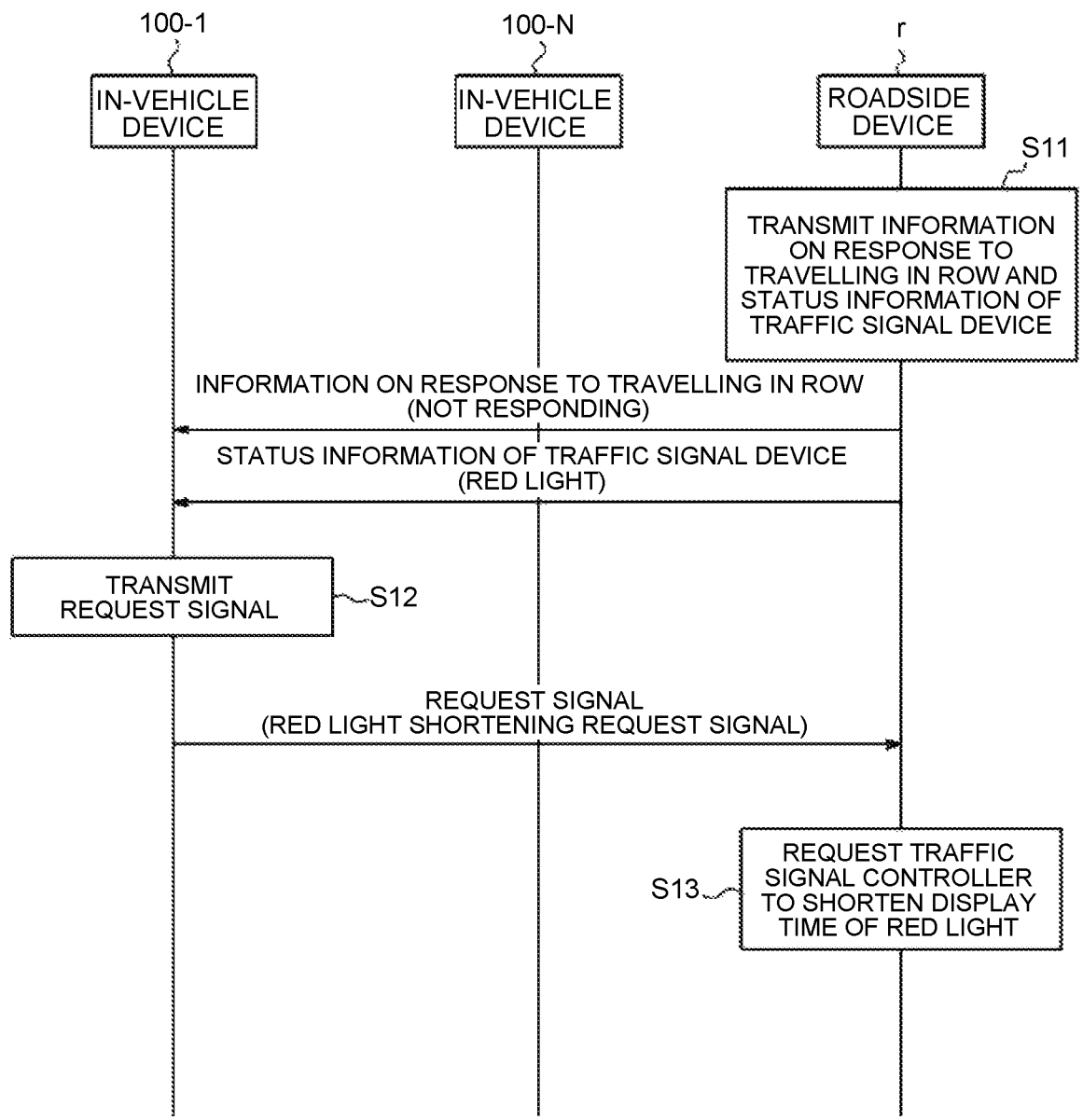
FIG. 4 is a sequence diagram illustrating the case in which the traffic signal controller does not respond to travelling in a row.

FIG. 4 is a sequence diagram illustrating a case in which the traffic signal controller does not respond to travelling in a row and the traffic signal "s" displays the red light.

The roadside device "r" transmits, to the vehicle 10 travelling in a row toward the intersection "j", the information on a response to travelling in a row and status information of the traffic signal device (step S11).

The in-vehicle device 100-1 mounted on the lead vehicle 10-1 acquires the information on a response to travelling in a row and the status information of the traffic signal device. In the example of FIG. 4, the information on a response to travelling in a row indicates that the traffic signal controller does not respond to travelling in a row. Further, the status information of the traffic signal device indicates that the traffic signal device "s" displays the red light.

As described above, when the traffic signal controller that does not respond to travelling in a row is required to shorten the display time of the red light of the traffic signal device "s", it is preferable that the lead vehicle 10-1 transmits the request signal to the roadside device "r". After acquiring the information on a response to travelling in a row and the status information of the traffic signal device, the in-vehicle device 100-1 mounted on the lead vehicle 10-1 transmits the red light shortening request signal (step S12).

Upon acquiring the red light shortening request signal, the roadside device "r" requests the traffic signal controller that controls the traffic signal device "s" to shorten the display time of the red light (step S13).

When Traffic Signal Controller Responds to Vehicles Travelling in Row

In a third case, it is assumed that the traffic signal controller that controls the traffic signal device "s" responds to travelling in a row (in other words, the traffic signal controller is configured to perform control to give priority to the vehicles travelling in a row). Here, the traffic signal controller performs control to give priority to the vehicle 10 travelling in a row, using the row length information. In other words, when the traffic signal device "s" displays the green light, the traffic light controller extends the display time of the green light until the rearmost vehicle 10-N passes through the intersection "j". In addition, when the traffic signal device "s" displays the red light, the traffic light controller shortens the display time of the red light such that the lead vehicle 10-1 does not stop. Here, the traffic signal controller calculates the time at which the row of the vehicles 10 passes the intersection "j" based on speed information of the vehicle 10 travelling in a row and the row length information of the vehicle 10 travelling in a row, and extends the display time of the green light or shortens the display time of the red light. Here, the speed information of the vehicles 10 may be calculated based on, for example, a difference in time at which the vehicles 10 pass each of a plurality of roadside devices "r", and distances between the plurality of roadside devices "r". In addition, as another example, the traffic signal controller may acquire, from the roadside device "r", the speed information of the vehicles 10.

FIG. 5 is a sequence diagram illustrating a case in which the traffic signal controller responds to travelling in a row.

The roadside device "r" transmits, to the vehicle 10 travelling in a row toward the intersection "j", the information on a response to travelling in a row and status information of the traffic signal device (step S21).

The in-vehicle device 100-1 mounted on the lead vehicle 10-1 acquires the information on a response to travelling in a row and the status information of the traffic signal device. In the example of FIG. 5, the information on a response to travelling in a row indicates that the traffic signal controller responds to travelling in a row.

After acquiring the information on a response to travelling in a row, the in-vehicle device 100-1 mounted on the lead vehicle 10-1 transmits a request signal and the row length information to the roadside device "r" (step S22). The request signal may be the green light extension request signal or the red light shortening request signal, depending on the status information of the traffic signal device. The roadside device "r" outputs the acquired row length information to the traffic signal controller. The traffic signal controller recognizes the row length of the vehicles 10 travelling in a row. Then, the traffic signal controller controls an operation of the traffic signal device "s" and performs control to give priority to the vehicle 10 travelling in a row.

FIG. 6 is a flowchart illustrating a determination process of the driving assistance system 1. The plurality of in-vehicle devices 100-1, 100-2, . . . , 100-N provided by the driving assistance system 1 execute the determination process below in conjunction with one another using, for example, inter-vehicle communication.

The driving assistance system 1 acquires, from the roadside device "r", the information on a response to travelling in a row and the status information of the traffic signal device (step S101).

Based on the information on a response to travelling in a row, the driving assistance system 1 determines whether the traffic signal controller responds to travelling in a row (step S102). As described below, based on the result of the determination in step S102, one of the plurality of in-vehicle devices 100-1, 100-2, . . . , 100-N to transmit the request signal is selected.

In the driving assistance system 1, when the traffic signal controller responds to travelling in a row (step S102: Yes), the in-vehicle device 100-1 mounted on the lead vehicle 10-1 transmits, to the roadside device "r", the request signal and the row length information (step S103).

When the traffic signal controller does not respond to travelling in a row (step S102: No), the driving assistance system 1 proceeds to the process of step S104.

Based on the status information of the traffic signal device, the driving assistance system 1 determines whether the traffic signal device "s" displays the green light (step S104).

In the driving assistance system 1, when the traffic signal device "s" displays the green light (step S104: Yes), the in-vehicle device 100-N mounted on the rearmost vehicle 10-N transmits the request signal to the roadside device "r" (step S105). The request signal in step S105 is the green light extension request signal.

In the driving assistance system 1, when the traffic signal device "s" does not display the green light (step S104: No), the in-vehicle device 100-1 mounted on the lead vehicle 10-1 transmits the request signal to the roadside device "r" (step S106). The request signal in step S106 is the red light shortening request signal.

With the above-described configuration, the driving assistance system 1 can reduce the probability of the row of the vehicles being divided even when the traffic signal controller does not respond to travelling in a row.

The present disclosure has been described above with reference to the drawings and the embodiment. However, it is to be noted that a person skilled in the art can easily make variations and modifications thereto, based on the present disclosure. Therefore, it is also to be noted that these variations and modifications fall within the scope of the present disclosure. For example, functions, and the like, included in each element, each step, or the like, can be rearranged so as not to be logically contradictory, and a plurality of elements, steps, or the like, may be combined into one or divided.

In the above embodiment, the in-vehicle device 100 determines the status of the traffic signal device "s" (whether the traffic light is green or red) based on the status information of the traffic signal device, and transmits the green light extension request signal or the red light shortening request signal. Here, the in-vehicle device 100 may transmit, to the roadside device "r", one request signal requesting to give priority regardless of the status of the traffic signal device "s". Here, the roadside device "r" that receives the request signal or the traffic signal controller may selectively extend the display time of the green light or shorten the display time of red light depending on the status of the traffic signal device "s".

In the above embodiment, when the vehicle 10 approaches the position of the roadside device "r", the communication unit 104 can communicate with the roadside device "r". Here, the roadside device "r" may function as a first virtual beacon located before the intersection "j", and a second virtual beacon located between the intersection "j" and the first virtual beacon. When the vehicle 10 is positioned between the first virtual beacon and the second virtual beacon, the communication unit 104 may be able to communicate with the roadside device "r". In such a case, the roadside device "r" may wirelessly communicate with the vehicle 10 in, for example, the 700 MHz band.

Further, for example, a processor mounted on a general-purpose electronic device may function as the determination unit 102. Specifically, a program that describes processing details for implementing each function of the determination unit 102 is stored in a memory of the electronic device. Each function of the determination unit 102 can be implemented when the program is read and executed by a processor of the electronic device.

What is claimed is:

1. A driving assistance system, comprising:
a plurality of in-vehicle devices configured to communicate with a roadside device, the plurality of in-vehicle devices being mounted on a plurality of vehicles travelling in a row, respectively, wherein:
one of the plurality of in-vehicle devices is configured to determine whether a traffic signal controller that controls a traffic signal device is configured to perform control to give priority to the plurality of vehicles travelling in the row based on information on a response to travelling in the row, acquired from the roadside device; and
the driving assistance system is configured to select, based on a result of the determination, one in-vehicle device, from among the plurality of in-vehicle devices, to transmit, to the roadside device, a request signal requesting to give priority to the plurality of vehicles.

2. The driving assistance system according to claim 1, wherein when the one of the plurality of in-vehicle devices determines that the traffic signal controller is not configured to perform control to give priority to the plurality of vehicles travelling in the row, and an extension of a display time of a green light of the traffic signal device is required, an in-vehicle device mounted on a rearmost vehicle among the plurality of vehicles is configured to transmit the request signal.

3. The driving assistance system according to claim 2, wherein the extension of the display time of the green light of the traffic signal device is requested when a traffic light is green.

4. The driving assistance system according to claim 1, wherein when the one of the plurality of in-vehicle devices determines that the traffic signal controller is not configured to perform control to give priority to the plurality of vehicles travelling in the row and shortening of a display time of a red light of the traffic signal device is required, an in-vehicle device mounted on a lead vehicle among the plurality of vehicles is configured to transmit the request signal.

5. The driving assistance system according to claim 4, wherein the shortening of the display time of the red light of the traffic signal device is requested when a traffic light is not green.

6. The driving assistance system according to claim 1, wherein when the one of the plurality of in-vehicle devices determines that the traffic signal controller is configured to perform control to give priority to the plurality of vehicles travelling in the row, an in-vehicle device mounted on a lead vehicle among the plurality of vehicles is configured to transmit the request signal.

7. The driving assistance system according to claim 6, wherein when the one of the plurality of in-vehicle devices determines that the traffic signal controller is configured to perform control to give priority to the plurality of vehicles travelling in the row, the in-vehicle device mounted on the lead vehicle among the plurality of vehicles is configured to further transmit row length information of the plurality of vehicles.

* * * * *